March 23, 1971 — L. G. SCHOLFIELD — 3,572,205

HARMONIC TEACHING DEVICE

Filed July 7, 1969 — 4 Sheets-Sheet 1

INVENTOR.
LOIS G. SCHOLFIELD

BY
ATTORNEY

March 23, 1971   L. G. SCHOLFIELD   3,572,205
HARMONIC TEACHING DEVICE

Filed July 7, 1969   4 Sheets-Sheet 2

INVENTOR.
LOIS G. SCHOLFIELD
BY Joseph G. Werner
James A. Kemmeler
ATTORNEY

March 23, 1971  L. G. SCHOLFIELD  3,572,205
HARMONIC TEACHING DEVICE

Filed July 7, 1969  4 Sheets-Sheet 3

INVENTOR.
LOIS G. SCHOLFIELD

BY *Joseph G. Werner*
*James A. Kemmeter*

ATTORNEY

March 23, 1971   L. G. SCHOLFIELD   3,572,205
HARMONIC TEACHING DEVICE

Filed July 7, 1969   4 Sheets-Sheet 4

INVENTOR.
LOIS G. SCHOLFIELD
BY *Joseph G. Werner*
*James A. Kemmeter*
ATTORNEY

United States Patent Office 3,572,205
Patented Mar. 23, 1971

3,572,205
HARMONIC TEACHING DEVICE
Lois G. Scholfield, 2109 Tawhee Drive,
Madison, Wis. 53711
Filed July 7, 1969, Ser. No. 839,295
Int. Cl. G09b 15/02
U.S. Cl. 84—474                       3 Claims

ABSTRACT OF THE DISCLOSURE

A music transposition and harmonic-pattern construction device having a plurality of concentric disks of decreasing radii with the notes of the musical scale produced in chromatic order around the periphery of each disk. The notes on each disk may be separated by blank spaces. In use, the operator may dial a harmonic pattern for any musical key and the device will simultaneously present the same pattern for all other musical keys.

BACKGROUND OF THE INVENTION

(1) Field of the invention

This device relates to a musical teaching device that enables a person to transpose any note, notes or chords in a particular key to the corresponding note, notes or chord in another key, and also to construct any harmonic pattern in any key and immediately have presented the same pattern for all other keys.

(2) Description of the prior art

Numerous music teaching devices and aids of various shapes and forms have been invented in the past. Among the known devices, some enable the operator to transpose single notes from one key to another key, and some enable the operator to transpose all the notes of one key to the corresponding notes of another key. In the latter type device, one problem is that all the notes of the compared keys are presented and the operator must visually pick out the desired compared notes and visually eliminate the compared notes not desired. One device of this type allows the operator to compare all the notes of a key to all the notes of any other key, but the operator cannot selectively choose and construct any chord or harmonic pattern and have immediately displayed the corresponding chord or pattern for all keys without having other notes intermingled in the display. Another such device allows the operator to selectively display the notes in a particular harmonic pattern but the notes of the corresponding pattern in all other keys are not also instantaneously presented; rather the operator must dial each key individually for the particular desired harmonic pattern in that key.

SUMMARY OF THE INVENTION

Generally, my invention comprises a teaching device whereby the operator is able to transpose any or all the notes in one musical key to the corresponding notes of any other key. In addition the operator can dial any harmonic pattern in any key and the corresponding harmonic pattern of all other keys will likewise have been simultaneously dialed, thereby enabling the operator to select any chord, arpeggio, scale, or other harmonic pattern in any key and instantaneously transpose the same to all other keys.

This is accomplished by a plurality of concentric disks of progressively smaller radii and rotatably connected by a rivet or pivot pin extending through the centers of said disks, each disk having imprinted thereon in a row around the periphery of each disk the notes of the musical scale.

DESCRIPTION OF PREFERRED EMBODIMENT

Figure 1:
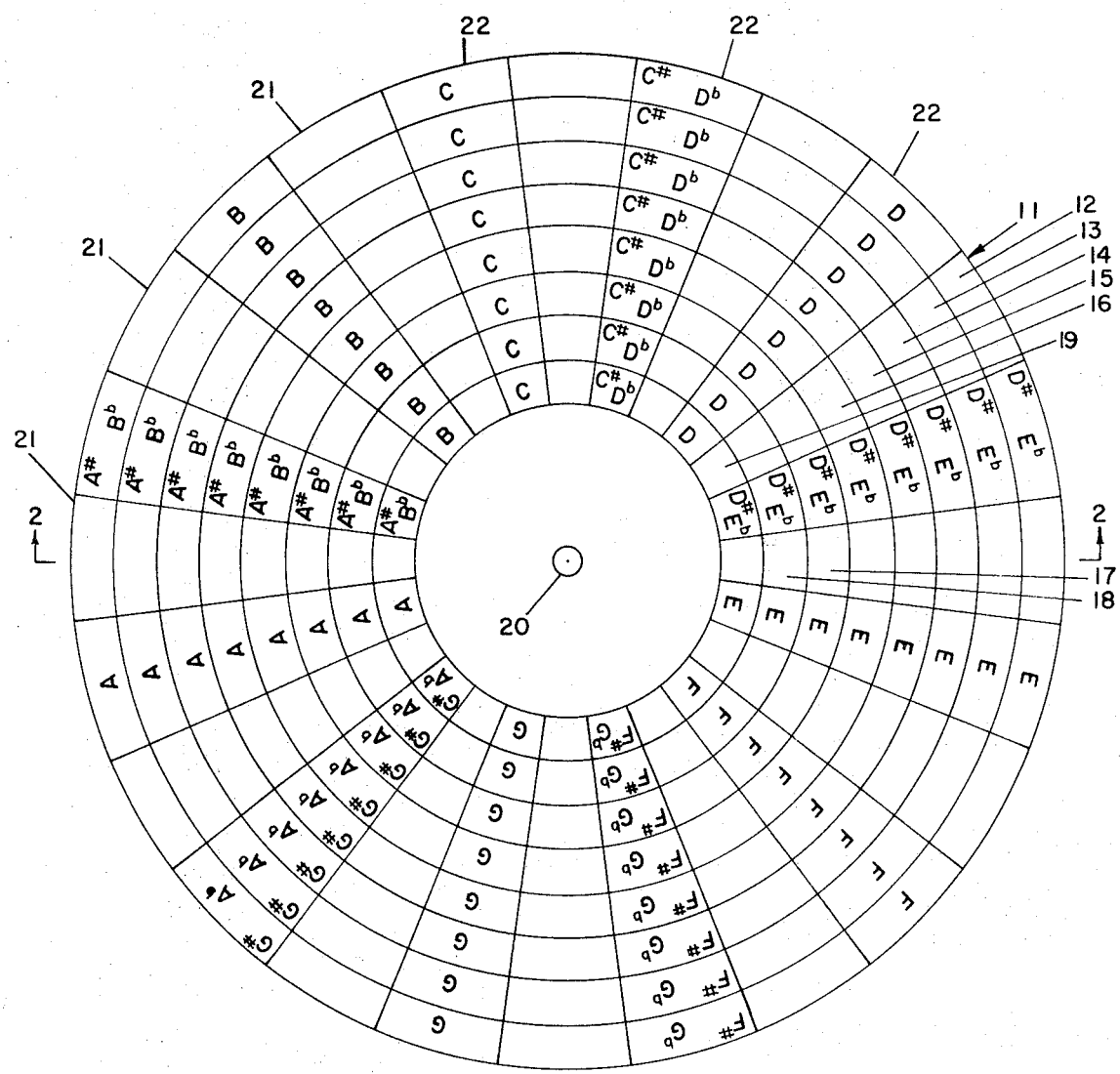
FIG. 1 is a plan view of the device with the notes of the musical scale imprinted on each disk.
Figure 2:
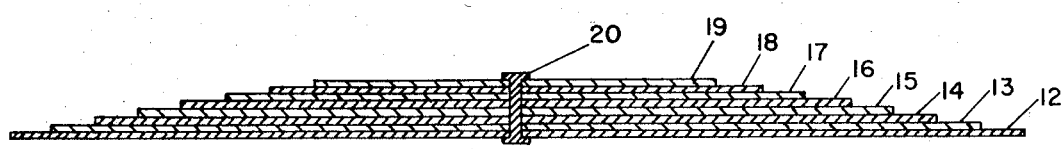
FIG. 2 is a sectional view taken substantially on the line 2—2 in FIG. 1.
Figure 3:
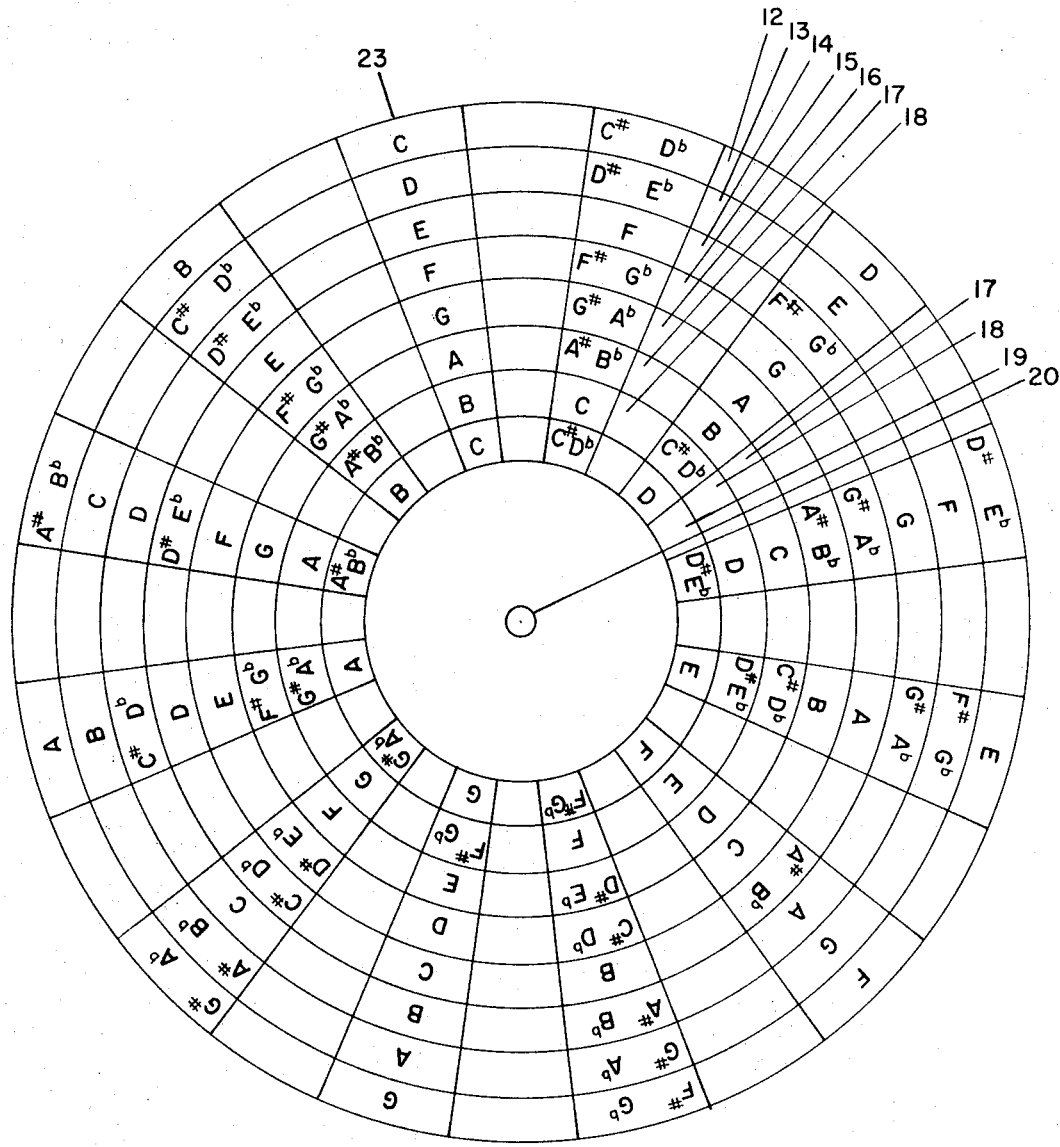
FIGS. 3, 4 and 5 are plan views with the disk dialed to display selected chords.
Figure 4:
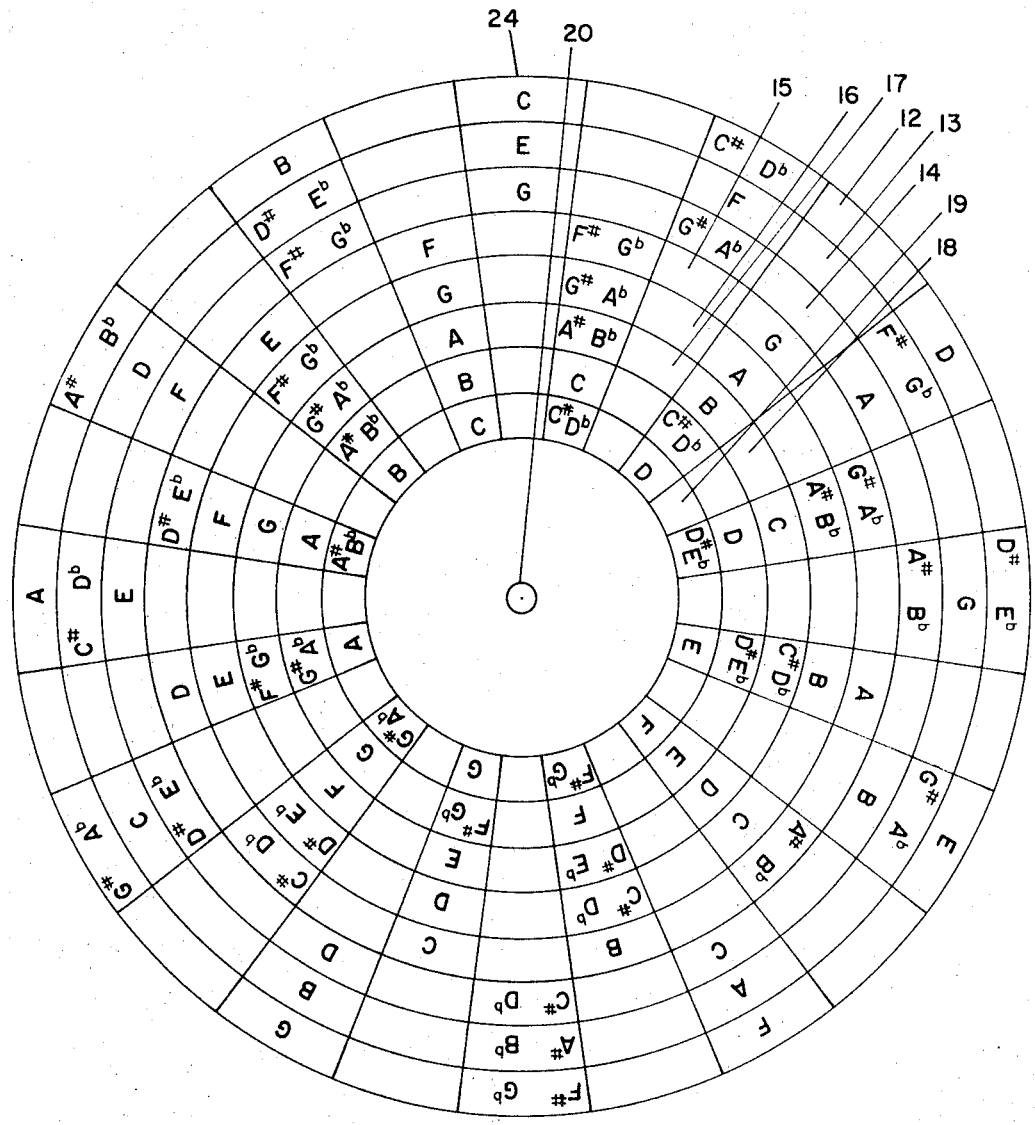
Figure 5:
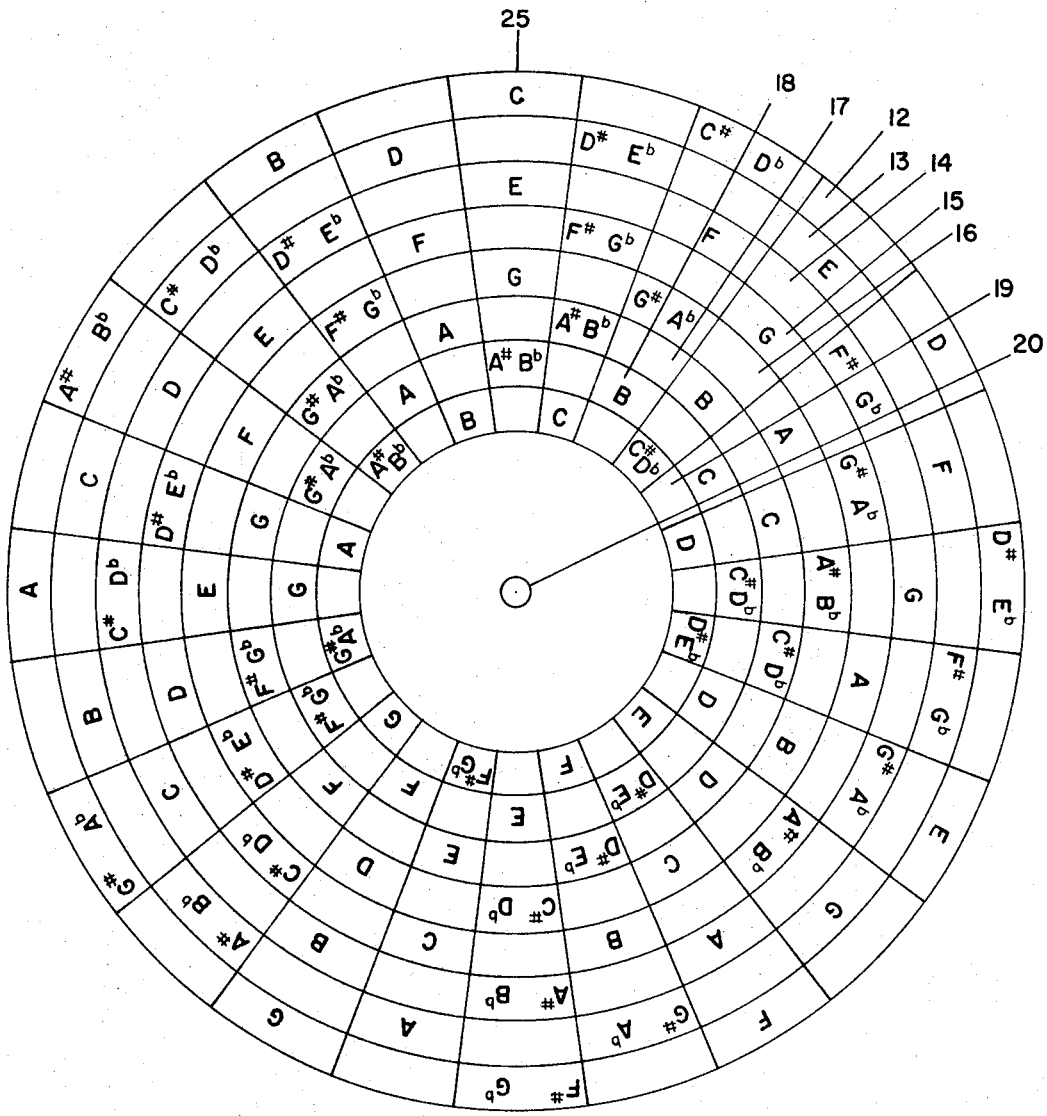

More specifically, referring to FIGS. 1 and 2, a preferred embodiment of my device 11 comprises eight concentric disks 12 through 19 shown stacked one atop another and rotatably connected by rivet 20 at their centers. Disk 12 is the base disk and is the largest disk, and each succeeding disk 13 through 19 has a smaller radius than the preceding disk over which it is mounted. Each disk is divided at its periphery into the same number of equal arcuate segments alternating between blank segments 21, and printed note segments 22 which depict the notes of the musical scale. It is noted that the segments 21 and 22 of each succeeding disk are proportionally smaller than the segments of the adjoining larger disk. The disks can therefore be dialed so that the blank segments 21 and segments 22 imprinted with notes can be radially aligned in any desired configuration. In FIGS. 1 and 3, the disks have been dialed so as to have alternating radially aligned spokes of blank segments and note segments. FIGS. 4 and 5 show a different configuration. Thus it is apparent that the operator of my device can align the separate disks into any radially aligned combination of up to eight note segments and blank segments, as desired.

Referring again to FIG. 1, it is seen that the twelve notes of the chromatic musical scale are imprinted on alternating note segments in the same order on each disk. To use my teaching device, the operator merely rotates the disks to bring selected note segments representing any desired harmonic pattern in any key into radial alignment, and the same pattern will be simultaneously presented by my device in each of the other musical keys. Referring to FIG. 3, and using the notes on base disk 12 as representing the various keys, it is seen that the major scale of the key of C has been dialed by alignment of the concentric discs 12–19, as shown by the note segments forming the radial spoke designated 23 as read from base disk 12 inward to disk 19. It may also be observed that the major scales of all of the other keys of the chromatic scale likewise are similarly aligned. Thus, the operator can read the notes of the major scale of any desired key by first finding the desired key note on disk 12 and then reading inward from disk 12 to disk 19 the notes of the radial spoke of which the desired key note segment is a part.

Referring to FIGS. 4 and 5, harmonic patterns of fewer notes than all the notes of the musical scale have been dialed. In FIG. 4, the major chord CEG of the key of C has been dialed as shown on the spoke designated by 24. It is then seen that the major chords of all the other keys may also be read inward from disk 12 to disk 14. In the preferred use of my device the remaining disks 15 through 19 have been dialed so that blank segments form the remainder of the spoke on which an harmonic pattern has been dialed, and likewise the other spokes are completed in the same manner. By so dialing the disks, ease of reading the desired corresponding harmonic patterns is made possible. It is noted that it is not necessary to use the outermost disks, but rather any of the disks may be used as the disk representing the keys and the notes in the harmonic patterns may be set upon any of the remaining disks, and the corresponding harmonic patterns of the other keys will appear in the same order on the same disks as the reference pattern. However, it is preferable to use the outermost disk 12 to represent the key note of the desired harmonic pattern.

FIG. 5 demonstrates an alternative way to align the notes of a harmonic pattern in the spoke, by alternating blank segments between the notes in the spoke. The corresponding harmonic pattern is automatically dialed into the corresponding segments of the spokes representing each key. For instance, the dominant 7th chord of the key of C is shown in the spoke designated by 25. Referring to the spoke designated by 26, it is seen that the dominant 7th chord for the key of G appears in the same order in the corresponding segments of the same disks. Likewise, the corresponding dominant 7th chord for each of the other keys also have been simultaneously dialed. Thus, it is seen that by dialing any harmonic pattern for any key, the operator can immediately read the corresponding harmonic pattern for any other key. My device therefore is an invaluable aid for all musicians but especially anyone who is a music student or writing music.

My improved device can also be used for simple harmonic transposition. The key note of the key being transposed is merely aligned with the key note of the key to which transposition is to be made on the adjoining disk. If it is desired to transpose from the key of C to the key of F, the operator aligns the note C on one of the disks, preferably disk 12 with the note F on an adjoining disk, preferably disk 13 and for ease of reading, the remaining disks in the spoke are dialed to blank segments. To transpose any note in the key of C to the corresponding note in the key of F, the operator merely finds the note on disk 12 and the transposed note of the new key is read on the aligned disk 13. For instance, note F in the key of C is transposed to the note B♭ in the key of F.

In musical transposition, the dialed notes may also represent chord names. That is, in the musical transposition from the key of C to the key of F, all chords of C, as C major, $C^7$, etc. become those corresponding chords in F, as F major, $F^7$, etc. All chords of F, in the key of C become the chords of B♭, as indicated on the disks when dialed for the transposition from the key of C to the key of F.

It is understood that the embodiments herein shown are only exemplificative of the concept of my invention, and that my invention is not confined to the particular construction or arrangement of parts herein illustrated and described, but embraces all equivalents thereof. For example, the blank segments of my device may be eliminated without limiting its application. However, the presence of the blank segments in my preferred embodiment make it possible to arrange only the desired note segments in radial alignment for easier reading and understanding.

I claim:
1. A music transposition and harmonic pattern construction device comprising:
   (a) a plurality of at least three concentric disks of decreasing radii, the exposed outer periphery of the face of each disk including twelve equal arcuate note segments,
   (b) indicia representing the twelve notes of the chromatic musical scale imprinted on each said disk, said indicia being individually located in said arcuate segments in ascending order,
   (c) said disks being rotatably attached at a common center, and being rotatable about said center to positions wherein any selected arcuate segments of any of said disks are in radial alignment.
2. The invention described in claim 1 wherein each of the arcuate note segments is separated from each adjacent arcuate note segment on the same disk by an arcuate blank segment of the same size as the adjacent note segments.
3. The invention described in claim 1 wherein eight concentric disks are employed to permit the radial alignment of segments representing an eight note musical scale.

References Cited
UNITED STATES PATENTS

| 854,572 | 5/1907 | Fitch | 84—474 |
| 3,481,241 | 12/1969 | Gaillard | 84—474 |

RICHARD B. WILKINSON, Primary Examiner

L. R. FRANKLIN, Assistant Examiner